United States Patent [19]

Iwans et al.

[11] 4,281,874
[45] Aug. 4, 1981

[54] AIRCRAFT SEAT WITH CANTILEVERED TRAY TABLE

[75] Inventors: Robert C. Iwans, Simsbury; Edward J. Brennan; Kirby B. Weik, both of Litchfield, all of Conn.

[73] Assignee: Koehler-Dayton, Inc., New Britain, Conn.

[21] Appl. No.: 42,982

[22] Filed: May 25, 1979

[51] Int. Cl.³ .................... A47B 83/02; A46C 7/62
[52] U.S. Cl. .................................. 297/163; 297/191
[58] Field of Search ............ 297/167, 191, 163, 117, 297/417; D6/42, 45, 48

[56] References Cited

U.S. PATENT DOCUMENTS

| 3,168,346 | 2/1965 | Rei, Jr. ................. 297/117 X |
| 3,336,076 | 8/1967 | Malitte ................. 297/163 X |
| 3,588,172 | 6/1971 | McGregor ............. 297/191 X |
| 3,653,713 | 4/1972 | Reason ................. 297/163 X |
| 4,141,586 | 2/1979 | Goldner et al. ...... 297/191 |
| 4,159,071 | 6/1979 | Roca ..................... 297/163 |

FOREIGN PATENT DOCUMENTS 328810  5/1930  United Kingdom ............ 297/163

Primary Examiner—James T. McCall
Attorney, Agent, or Firm—Spencer T. Smith

[57] ABSTRACT

A vehicular seat, such as an aircraft seat, comprising a seat bottom portion, a seat back portion mounted for pivotal movement about a selected pivot axis and having a predetermined upright position, a tray assembly including a tray member and leg means mounted for pivotal movement about the pivot axis from a first storage position to a second in use position, the tray member mounted on the leg means and having a horizontal in use position and a storage position whereat the tray defines the rear surface of the seat back portion, the leg menas having first and second segments joined by a bend having a predetermined angle, and the leg means being selectively configured so that when the tray assembly is in the in use position the bend will be proximate the seat back and one of the segments will be substantially horizontal whereby the tray assembly will not interfere with the lateral leg movement of a user of the tray assembly.

4 Claims, 3 Drawing Figures

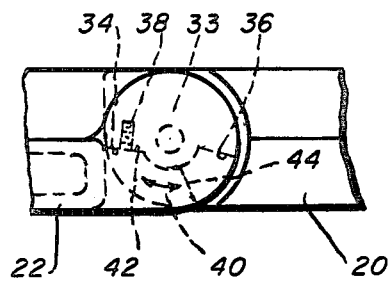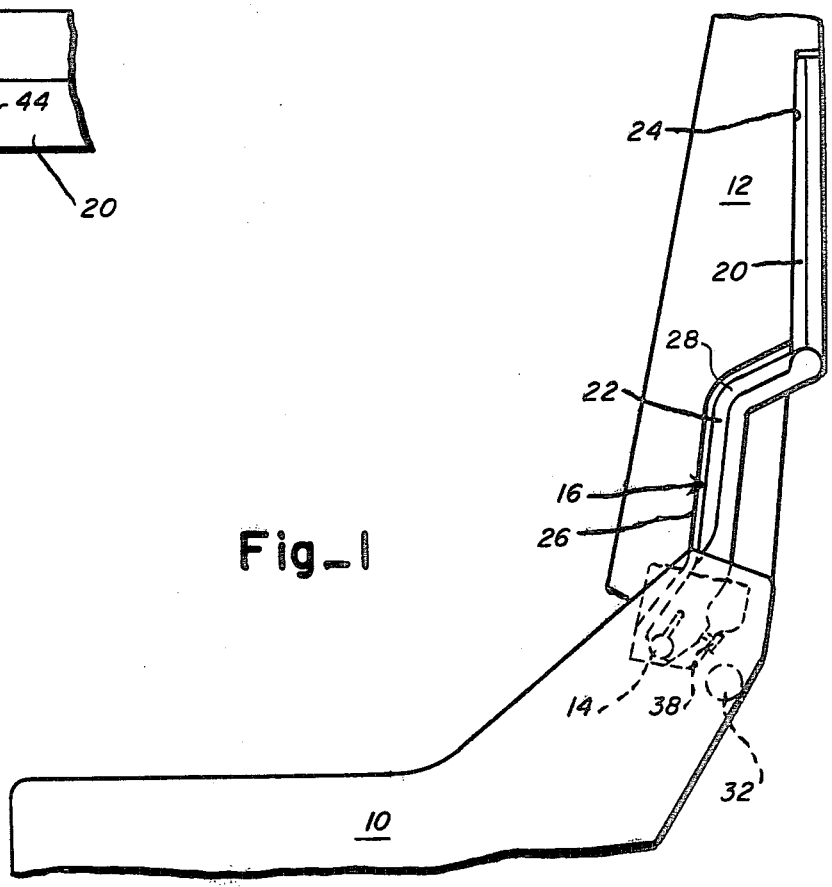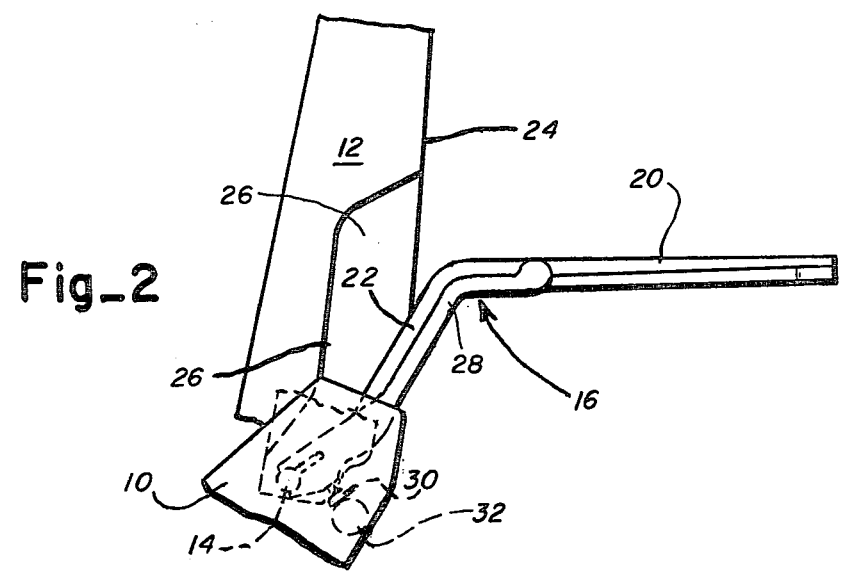

AIRCRAFT SEAT WITH CANTILEVERED TRAY TABLE

The present invention relates to vehicular seats, and particularly to aircraft seats.

Vehicular seats generally include a seat bottom member and a seat back member. The seat back member is usually mounted for pivotal movement on the seat bottom member at a location in the plane of the seat bottom, i.e., at a low pivot location.

The seat back tray must then be supported from the low pivot position so that the tray will remain in its horizontal, in use, position regardless of seat back orientation. In addition to a strut or struts extending from the low pivot to the tray, the tray support mechanism will also include struts connecting the tray to the seat back itself.

Not only is such structure complex, and hence, expensive, it interferes with movements of a seat occupant when the tray is in use, with the struts confining the seat occupant's legs.

It is, accordingly, an object of the present invention to provide a vehicular seat having a tray support mechanism which is simple in construction, and hence, inexpensive and which will not confine the legs of a seat occupant.

Other objects and advantages of the present invention will become apparent from the following portion of this specification and from the accompanying drawing which illustrates, in accordance with the mandate of the patent statutes, a presently preferred embodiment incorporating the principals of the invention.

Referring to the drawing:

FIG. 1 is a side elevational view of an aircraft seat;

FIG. 2 is a side elevational view of a portion of the aircraft seat showing the seat back tray in a horizontal, in use, position; and FIG. 3 is an enlarged view of a portion of the seat tray assembly shown in FIG. 2.

The aircraft or other vehicular seat includes a seat bottom portion 10 and a seat back portion 12 mounted for pivotal movement about seat bottom shaft 14. Secured to the seat is a tray assembly 16 which is shown in the vertical, storage, position in FIG. 1 and in the horizontal, in use, position in FIG. 2.

The tray assembly includes a tray 20 and cantilevered support members 22 which are secured at one end for pivotal movement on the seat bottom shaft 14 and are secured at the other end to the rear edge of the tray table.

As can be seen from FIG. 1, the seat tray assembly, when in the storage position, is received by selectively defined cutouts which are contoured into the exterior surfaces of the seat back. Specifically, the tray 20 fits into a substantially rectangular cutout 24 in the back surface of the seat back and and cantilevered legs 22 are received in a substantially rectangular cutout 26 in the side surfaces of the seat back. As can be seen in FIG. 2, each cantilevered leg is configured with a bend 28 to allow the end segment of the leg which projects from the seat back to lie in a substantially horizontal plane when lowered. As shown, the interior surface of the side cutout substantially conforms to the configuration of the cantilevered legs.

When the tray assembly is pivoted to the in use position, an adjustable bolt 30, which is threadably received by a threaded bore in the bottom of each cantilevered leg 22, engages a stop 32 which is integral with the seat bottom portion.

The joint established between the tray and one of the legs or supports is shown in FIG. 3. Integral with the end of the leg is a semi-cylindrical stop member 33 having and stop surfaces 34 and 36. Integral with the interior edge of the tray table is also a semi-cylindrical stop member 40 having stop surfaces 42 and 44. The leg stop member 33 has a central bore which interconnects with a suitably configured nipple on the tray stop member 40 or in any other conventional manner. Tray rotation relative to the leg end is limited in a clockwise direction by the leg stop 33 engaging the tray stop 40 on the stop surfaces 34 and 42, respectively. An adjustment screw 38 is located on the leg stop surface 34 to enable the clockwise limit of the tray rotation to be selectively determined. When the screw 38 is extended, the head of the screw, instead of the leg stop surface 34, limits the clockwise rotation of the tray. Tray rotation in a counterclockwise direction relative to the leg end is limited by the tray stop surface 44 engaging the leg stop surface 36.

As can be seen from FIG. 3, a limited degree of rotation of the horizontally positioned tray relative to the leg is provided so that a seat occupant can rotationally elevate the tray without lifting the tray legs to secure clearance for ingress or egress.

When the tray is in its horizontal position, the segment of the cantilevered leg which extends outwardly from the seat back lies in a substantially horizontal plane thereby interfering to a minimum degree with leg movement of a seat occupant using the tray.

What is claimed is:

1. A vehicular seat comprising a seat bottom, a seat back mounted for pivotal movement about a selected pivot axis having a selected upright position, a tray assembly including a pair of legs mounted on either side of said seat back for pivotal movement about said seat back pivot axis from a storage position to an in-use position, said legs each including a first portion extending upwardly from said seat back pivot axis and a second portion joined at one end via a bend to the top of said first portion, a tray, means for mounting said tray on the other end of said second portions for selected pivotal displacement relative thereto from a first position wherein the bottom surface of said tray defines a portion of the back surface of said seat back when said legs are in the storage position to a second horizontal position when said legs are in the in-use position, said bends having an angle selected so that said second portion of each of said legs will be substantially horizontal when said legs are in the in-use position and said legs being selectively configured so that when said seat back is in said upright position pivotal displacement of said legs about said seat back pivot axis from the storage position to the in-use position will displace said bends from a location substantially forwardly spaced from the back surface of the seat back to a location proximate the back surface and will displace the other end of said second portions from a location proximate the back surface of said seat back to a location substantially rearwardly spaced from the back surface.

2. A vehicular seat according to claim 1, wherein said first portion of said legs extends substantially vertically upwardly when said legs are in the storage position.

3. A vehicular seat according to claim 1, wherein said seat bottom includes a horizontal occupant supporting portion and said seat back pivot axis is substantially above said horizontal portion.

4. A vehicular seat according to claim 1, wherein said seat back includes two selectively configured side cut outs and a selectively configured back cut out for receiving said tray assembly legs and tray, respectively, when said tray assembly is in said storage position.

* * * * *